US007768496B2

(12) United States Patent
Daly

(10) Patent No.: US 7,768,496 B2
(45) Date of Patent: Aug. 3, 2010

(54) METHODS AND SYSTEMS FOR IMAGE TONESCALE ADJUSTMENT TO COMPENSATE FOR A REDUCED SOURCE LIGHT POWER LEVEL

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 791 days.

(21) Appl. No.: 11/564,203

(22) Filed: Nov. 28, 2006

(65) Prior Publication Data

US 2007/0092139 A1 Apr. 26, 2007

Related U.S. Application Data

(63) Continuation-in-part of application No. 11/154,053, filed on Jun. 15, 2005, and a continuation-in-part of application No. 11/154,054, filed on Jun. 15, 2005, and a continuation-in-part of application No. 11/154,052, filed on Jun. 15, 2005.

(60) Provisional application No. 60/670,749, filed on Apr. 11, 2005, provisional application No. 60/660,049, filed on Mar. 9, 2005, provisional application No. 60/632,776, filed on Dec. 2, 2004, provisional application No. 60/632,779, filed on Dec. 2, 2004.

(51) Int. Cl.
*G09G 3/36* (2006.01)
*G09G 5/10* (2006.01)
*G06K 9/00* (2006.01)

(52) U.S. Cl. ....................... 345/102; 345/690; 345/211; 382/168

(58) Field of Classification Search ................ 345/211, 345/214, 78–104, 690, 87, 98–100
See application file for complete search history.

(56) References Cited

U.S. PATENT DOCUMENTS 4,020,462 A 4/1977 Morrin (Continued)

FOREIGN PATENT DOCUMENTS

EP 0841652 5/1998

(Continued)

OTHER PUBLICATIONS

International Application No. PCT/US05/043560 International Search Report.

(Continued)

*Primary Examiner*—Duc Q Dinh
(74) *Attorney, Agent, or Firm*—Krieger Intellectual Property, Inc.; Scott C. Krieger

(57) ABSTRACT

Embodiments of the present invention comprise systems, methods and devices for increasing the perceived brightness of an image. In some embodiments this increase compensates for a decrease in display light-source illumination.

20 Claims, 10 Drawing Sheets

U.S. PATENT DOCUMENTS

| | | | |
|---|---|---|---|
| 4,196,452 | A | 4/1980 | Warren et al. |
| 4,223,340 | A | 9/1980 | Bingham et al. |
| 4,268,864 | A | 5/1981 | Green |
| 4,399,461 | A | 8/1983 | Powell |
| 4,402,006 | A | 8/1983 | Karlock |
| 4,523,230 | A | 6/1985 | Harlan |
| 4,536,796 | A | 8/1985 | Harlan |
| 4,549,212 | A | 10/1985 | Bayer |
| 4,553,165 | A | 11/1985 | Bayer |
| 4,709,262 | A | 11/1987 | Spieth et al. |
| 4,847,603 | A | 7/1989 | Blanchard |
| 4,962,426 | A | 10/1990 | Naoi et al. |
| 5,025,312 | A | 6/1991 | Faroudja |
| 5,046,834 | A | 9/1991 | Dietrich |
| 5,081,529 | A | 1/1992 | Collette |
| 5,176,224 | A | 1/1993 | Spector |
| 5,218,649 | A | 6/1993 | Kundu et al. |
| 5,227,869 | A | 7/1993 | Degawa |
| 5,235,434 | A | 8/1993 | Wober |
| 5,260,791 | A | 11/1993 | Lubin |
| 5,270,818 | A | 12/1993 | Ottenstein |
| 5,389,978 | A | 2/1995 | Jeong-Hun |
| 5,526,446 | A | 6/1996 | Adelson |
| 5,528,257 | A | 6/1996 | Okumura et al. |
| 5,651,078 | A | 7/1997 | Chan |
| 5,696,852 | A | 12/1997 | Minoura et al. |
| 5,857,033 | A | 1/1999 | Kim |
| 5,912,992 | A | 6/1999 | Sawanda et al. |
| 5,920,653 | A | 7/1999 | Silverstein |
| 5,952,992 | A | 9/1999 | Helms |
| 5,956,014 | A | 9/1999 | Kuriyama et al. |
| 6,055,340 | A | 4/2000 | Nagao |
| 6,075,563 | A | 6/2000 | Hung |
| 6,275,207 | B1 | 8/2001 | Nitta et al. |
| 6,278,421 | B1 | 8/2001 | Ishida et al. |
| 6,795,063 | B2 | 8/2001 | Endo et al. |
| 6,285,798 | B1 | 9/2001 | Lee |
| 6,317,521 | B1 | 11/2001 | Gallagher et al. |
| 7,142,218 | B2 | 11/2001 | Yoshida |
| 6,424,730 | B1 | 7/2002 | Wang et al. |
| 6,573,961 | B2 | 8/2002 | Jiang et al. |
| 6,445,835 | B1 | 9/2002 | Qian |
| 6,504,953 | B1 | 1/2003 | Behrends |
| 6,507,668 | B1 | 1/2003 | Park |
| 6,516,100 | B1 | 2/2003 | Qian |
| 6,546,741 | B2 | 4/2003 | Yun et al. |
| 6,560,018 | B1 | 5/2003 | Swanson |
| 6,583,579 | B2 | 6/2003 | Tsumura |
| 6,593,934 | B1 | 7/2003 | Liaw et al. |
| 6,594,388 | B1 | 7/2003 | Gindele et al. |
| 6,600,470 | B1 | 7/2003 | Tsuda |
| 6,618,042 | B1 | 9/2003 | Powell |
| 6,618,045 | B1 | 9/2003 | Lin |
| 6,628,823 | B1 | 9/2003 | Holm |
| 7,259,769 | B2 | 9/2003 | Diefenbaugh |
| 6,677,959 | B1 | 1/2004 | James |
| 6,728,416 | B1 | 4/2004 | Gallagher |
| 6,753,835 | B1 | 6/2004 | Sakai |
| 6,782,137 | B1 | 8/2004 | Avinash |
| 6,788,280 | B2 | 9/2004 | Ham |
| 6,809,717 | B2 | 10/2004 | Asao |
| 6,809,718 | B2 | 10/2004 | Wei et al. |
| 7,202,458 | B2 | 10/2004 | Park |
| 6,816,141 | B1 | 11/2004 | Fergason |
| 7,352,347 | B2 | 11/2004 | Fergason |
| 6,934,772 | B2 | 8/2005 | Bui et al. |
| 7,006,688 | B2 | 2/2006 | Zaklika et al. |
| 7,010,160 | B1 | 3/2006 | Yoshida |
| 7,088,388 | B2 | 8/2006 | MacLean et al. |
| 7,098,927 | B2 | 8/2006 | Daly et al. |
| 7,110,062 | B1 | 9/2006 | Whitted et al. |

| | | | |
|---|---|---|---|
| 7,158,686 | B2 | 1/2007 | Gindele |
| 7,176,878 | B2 * | 2/2007 | Lew et al. .................. 345/102 |
| 7,199,776 | B2 * | 4/2007 | Ikeda et al. .................. 345/89 |
| 7,289,154 | B2 | 10/2007 | Gindele |
| 7,330,287 | B2 | 2/2008 | Sharman |
| 7,433,096 | B2 | 10/2008 | Chase et al. |
| 7,466,301 | B2 * | 12/2008 | Sohn et al. .................. 345/102 |
| 7,532,239 | B2 | 5/2009 | Hayaishi |
| 7,564,438 | B2 | 7/2009 | Kao et al. |
| 2001/0031084 | A1 | 10/2001 | Cannata et al. |
| 2002/0008784 | A1 | 1/2002 | Shirata et al. |
| 2002/0057238 | A1 | 5/2002 | Nitta |
| 2002/0167629 | A1 | 11/2002 | Blanchard |
| 2002/0181797 | A1 | 12/2002 | Young |
| 2003/0001815 | A1 | 1/2003 | Cui |
| 2003/0012437 | A1 | 1/2003 | Zaklika et al. |
| 2003/0051179 | A1 | 3/2003 | Tsirkel et al. |
| 2003/0053690 | A1 | 3/2003 | Trifonov et al. |
| 2003/0146919 | A1 | 8/2003 | Kawashima |
| 2003/0169248 | A1 | 9/2003 | Kim |
| 2003/0179213 | A1 | 9/2003 | Liu |
| 2003/0193472 | A1 | 10/2003 | Powell |
| 2003/0201968 | A1 | 10/2003 | Itoh |
| 2003/0223634 | A1 | 12/2003 | Gallagher et al. |
| 2003/0235342 | A1 | 12/2003 | Gindele |
| 2004/0001184 | A1 | 1/2004 | Gibbons et al. |
| 2004/0198468 | A1 | 2/2004 | Wen |
| 2004/0081363 | A1 | 4/2004 | Gindele et al. |
| 2004/0095531 | A1 | 5/2004 | Jiang et al. |
| 2004/0113905 | A1 | 6/2004 | Mori et al. |
| 2004/0113906 | A1 | 6/2004 | Lew |
| 2004/0119950 | A1 | 6/2004 | Penn |
| 2004/0130556 | A1 | 7/2004 | Nokiyama |
| 2004/0160435 | A1 | 8/2004 | Cui et al. |
| 2004/0170316 | A1 | 9/2004 | Saquib |
| 2004/0201562 | A1 | 10/2004 | Funamoto |
| 2004/0207609 | A1 | 10/2004 | Hata |
| 2004/0207635 | A1 | 10/2004 | Miller et al. |
| 2004/0208363 | A1 | 10/2004 | Berge et al. |
| 2004/0239612 | A1 | 12/2004 | Asao |
| 2005/0001801 | A1 | 1/2005 | Kim |
| 2005/0057484 | A1 | 3/2005 | Diefenbaugh et al. |
| 2005/0104839 | A1 | 5/2005 | Baik |
| 2005/0104840 | A1 | 5/2005 | Sohn et al. |
| 2005/0117798 | A1 | 6/2005 | Patton et al. |
| 2005/0140639 | A1 | 6/2005 | Oh et al. |
| 2005/0147317 | A1 | 7/2005 | Daly et al. |
| 2005/0152614 | A1 | 7/2005 | Daly et al. |
| 2005/0184952 | A1 | 8/2005 | Konno |
| 2005/0190142 | A1 | 9/2005 | Ferguson |
| 2005/0195212 | A1 | 9/2005 | Kurumisawa |
| 2005/0200868 | A1 | 9/2005 | Yoshida |
| 2005/0232482 | A1 | 10/2005 | Ikeda et al. |
| 2005/0244053 | A1 | 11/2005 | Hayaishi |
| 2005/0248503 | A1 | 11/2005 | Schobben et al. |
| 2006/0012987 | A9 | 1/2006 | Ducharme et al. |
| 2006/0015758 | A1 | 1/2006 | Yoon et al. |
| 2006/0072158 | A1 | 4/2006 | Christie |
| 2006/0119612 | A1 | 6/2006 | Kerofsky |
| 2006/0119613 | A1 | 6/2006 | Kerofsky |
| 2006/0120489 | A1 | 6/2006 | Lee |
| 2006/0146236 | A1 | 7/2006 | Wu et al. |
| 2006/0174105 | A1 | 8/2006 | Park |
| 2006/0209003 | A1 | 9/2006 | Kerofsky |
| 2006/0209005 | A1 | 9/2006 | Pedram et al. |
| 2006/0221046 | A1 | 10/2006 | Sato |
| 2006/0238827 | A1 | 10/2006 | Ikeda |
| 2006/0256840 | A1 | 11/2006 | Alt |
| 2006/0262111 | A1 | 11/2006 | Kerofsky |
| 2006/0267923 | A1 | 11/2006 | Kerofsky |
| 2006/0284822 | A1 | 12/2006 | Kerofsky |
| 2006/0284823 | A1 | 12/2006 | Kerofsky |
| 2006/0284883 | A1 | 12/2006 | Kerofsky |

| | | | |
|---|---|---|---|
| 2007/0002004 | A1 | 1/2007 | Woo |
| 2007/0035565 | A1 | 2/2007 | Kerofsky |
| 2007/0092139 | A1 | 4/2007 | Daly |
| 2007/0097069 | A1 | 5/2007 | Kurokawa |
| 2007/0103418 | A1 | 5/2007 | Ogino |
| 2007/0126757 | A1 | 6/2007 | Itoh |
| 2007/0146236 | A1 | 6/2007 | Kerofsky et al. |
| 2007/0211049 | A1 | 9/2007 | Kerofsky |
| 2007/0268524 | A1 | 11/2007 | Nose |
| 2008/0024517 | A1 | 1/2008 | Kerofsky |
| 2008/0037867 | A1 | 2/2008 | Lee |
| 2008/0074372 | A1 | 3/2008 | Baba |
| 2008/0094426 | A1 | 4/2008 | Kimpe |
| 2008/0180373 | A1 | 7/2008 | Mori |
| 2008/0231581 | A1 | 9/2008 | Fujine |
| 2009/0002285 | A1 | 1/2009 | Baba |
| 2009/0051714 | A1 | 2/2009 | Ohhara |

FOREIGN PATENT DOCUMENTS

| | | |
|---|---|---|
| EP | 963112 | 12/1999 |
| FR | 2782566 | 2/2000 |
| JP | 3102579 | 4/1991 |
| JP | 3284791 | 12/1991 |
| JP | 8009154 | 1/1996 |
| JP | 11194317 | 7/1999 |
| JP | 200056738 | 2/2000 |
| JP | 2000148072 | 5/2000 |
| JP | 2000259118 | 9/2000 |
| JP | 2001057650 | 2/2001 |
| JP | 2001083940 | 3/2001 |
| JP | 2001086393 | 3/2001 |
| JP | 2001298631 | 10/2001 |
| JP | 2002189450 | 7/2002 |
| JP | 2003259383 | 9/2003 |
| JP | 2003271106 | 9/2003 |
| JP | 2003316318 | 11/2003 |
| JP | 2004007076 | 1/2004 |
| JP | 200445634 | 2/2004 |
| JP | 2004133577 | 4/2004 |
| JP | 2004177547 | 6/2004 |
| JP | 2004272156 | 9/2004 |
| JP | 2004287420 | 10/2004 |
| JP | 2004325628 | 11/2004 |
| JP | 2005346032 | 12/2005 |
| JP | 2006042191 | 2/2006 |
| JP | 2006317757 | 11/2006 |
| JP | 2007093990 | 4/2007 |
| JP | 2007212628 | 8/2007 |
| JP | 2007272023 | 10/2007 |
| JP | 2007299001 | 11/2007 |
| WO | WO02099557 | 12/2002 |
| WO | WO03039137 | 5/2003 |
| WO | WO2004075155 | 9/2004 |
| WO | WO2005029459 | 3/2005 |

OTHER PUBLICATIONS

International Application No. PCT/US05/043560 International Preliminary Examination Report.
International Application No. PCT/US05/043641 International Search Report.
International Application No. PCT/US05/043641 International Preliminary Examination Report.
International Application No. PCT/US05/043647 International Search Report.
International Application No. PCT/US05/043647 International Preliminary Examination Report.
International Application No. PCT/US05/043640 International Search Report.
International Application No. PCT/ US05/043640 International Preliminary Examination Report.
International Application No. PCT/US05/043646 International Search Report.
International Application No. PCT/US05/043646 International Preliminary Examination Report.
U.S. Appl. No. 11/154,054—Office Action dated Mar. 25, 2008.
U.S. Appl. No. 11/293,066—Office Action dated Jan. 1, 2008.
U.S. Appl. No. 11/371,466—Office Action dated Oct. 5, 2007.
International Application No. PCT/JP08/064669 International Search Report.
Richard J. Qian, et al, "Image Retrieval Using Blob Histograms", Proceeding of 2000 IEEE International Conference on Multimedia and Expo, vol. 1, Aug. 2, 2000, pp. 125-128.
U.S. Appl. No. 11/154,054—Office Action dated Dec. 30, 2008.
U.S. Appl. No. 11/154,053—Office Action dated Oct. 1, 2008.
U.S. Appl. No. 11/460,940—Notice of Allowance dated Dec. 15, 2008.
U.S. Appl. No. 11/202,903—Office Action dated Oct. 3, 2008.
U.S. Appl. No. 11/224,792—Office Action dated Nov. 10, 2008.
U.S. Appl. No. 11/371,466—Office Action dated Sep. 23, 2008.
PCT App. No. PCT/JP2008/064669—Invitation to Pay Additional Fees dated Sep. 29, 2008.
PCT App. No. PCT/JP2008/069815—Invitation to Pay Additional Fees dated Dec. 5, 2005.
U.S. Appl. No. 11/371,466—Office Action dated Apr. 11, 2008.
International Application No. PCT/JP08/069815 International Search Report.
International Application No. PCT/JP08/072215 International Search Report.
International Application No. PCT/JP08/073898 International Search Report.
International Application No. PCT/JP08/073146 International Search Report.
International Application No. PCT/JP08/072715 International Search Report.
International Application No. PCT/JP08/073020 International Search Report.
International Application No. PCT/JP08/072001 International Search Report.
International Application No. PCT/JP04/013856 International Search Report.
PCT App. No. PCT/JP08/071909—Invitation to Pay Additional Fees dated Jan. 13, 2009.
U.S. Appl. No. 11/154,052—Office Action dated Apr. 27, 2009.
U.S. Appl. No. 11/154,053—Office Action dated Jan. 26, 2009.
U.S. Appl. No. 11/202,903—Office Action dated Feb. 5, 2009.
U.S. Appl. No. 11/224,792—Office Action dated Apr. 15, 2009.
U.S. Appl. No. 11/293,066—Office Action dated May 16, 2008.
U.S. Appl. No. 11/371,466—Office Action dated Apr. 14, 2009.
International Application No. PCT/JP08/071909 International Search Report.
PCT App. No. PCT/JP08/073020—Replacement Letter dated Apr. 21, 2009.
A. Iranli, W. Lee, and M. Pedram, "HVS-Aware Dynamic Backlight Scaling in TFT LCD's", Very Large Scale Integration (VLSI) Systems, IEEE Transactions vol. 14 No. 10 pp. 1103-1116, 2006.
L. Kerofsky and S. Daly "Brightness preservation for LCD backlight reduction" SID Symposium Digest vol. 37, 1242-1245 (2006).
L. Kerofsky and S. Daly "Addressing Color in brightness preservation for LCD backlight reduction" ADEAC 2006 pp. 159-162.
L. Kerofsky "LCD Backlight Selection through Distortion Minimization", IDW 2007 pp. 315-318.
International Application No. PCT/JP08/053895 International Search Report.
U.S. Appl. No. 11/154,054—Office Action dated Aug. 5, 2008.
U.S. Appl. No. 11/460,940—Office Action dated Aug. 7, 2008.
Wei-Chung Cheng and Massoud Pedram, "Power Minimization in a Backlit TFT-LCD Display by Concurrent Brightness and Contrast Scaling" IEEE Transactions on Consumer Electronics, Vo. 50, No. 1, Feb. 2004.
Insun Hwang, Cheol Woo Park, Sung Chul Kang and Dong Sik Sakong, "Image Synchronized Brightness Control" SID Symposium Digest 32, 492 (2001).
Inseok Choi, Hojun Shim and Naehyuck Chang, "Low-Power Color TFT LCD Display for Hand-Held Embedded Systems", in ISLPED, 2002.

A. Iranli, H. Fatemi, and M. Pedram, "HEBS: Histogram equalization for backlight scaling," Proc. of Design Automation and Test in Europe, Mar. 2005, pp. 346-351.

Chang, N., Choi, I., and Shim, H. 2004. DLS: dynamic backlight luminance scaling of liquid crystal display. IEEE Trans. Very Large Scale lntegr. Syst. 12, 8 (Aug. 2004), 837-846.

S. Pasricha, M Luthra, S. Mohapatra, N. Dutt, N. Venkatasubramanian, "Dynamic Backlight Adaptation for Low Power Handheld Devices," To appear in IEEE Design and Test (IEEE D&T), Special Issue on Embedded Systems for Real Time Embedded Systems, Sep. 8, 2004.

H. Shim, N. Chang, and M. Pedram, "A backlight power management framework for the battery-operated multimedia systems." IEEE Design and Test Magazine, Sep./Oct. 2004, pp. 388-396.

F. Gatti, A. Acquaviva, L. Benini, B. Ricco', "Low-Power Control Techniques for TFT LCD Displays," Compiler, Architectures and Synthesis of Embedded Systems, Oct. 2002.

Ki-Duk Kim, Sung-Ho Baik, Min-Ho Sohn, Jae-Kyung Yoon, Eui-Yeol Oh and In-Jae Chung, "Adaptive Dynamic Image Control for IPS-Mode LCD TV", SID Symposium Digest 35, 1548 (2004).

Raman and Hekstra, "Content Based Contrast Enhancement for Liquid Crystal Displays with Backlight Modulation", IEEE Transactions on Consumer Electronics, vol. 51, No. 1, Feb. 2005.

E.Y. Oh, S. H. Balik, M. H. Sohn, K. D. Kim, H. J. Hong, J.Y. Bang, K.J. Kwon, M.H. Kim, H. Jang, J.K. Yoon and I.J. Chung, "IPS-mode dynamic LCD-TV realization with low black luminance and high contrast by adaptive dynamic image control technology", Journal of the Society for Information Display, Mar. 2005, vol. 13, Issue 3, pp. 181-266.

Fabritus, Grigore, Muang, Loukusa, Mikkonen, "Towards energy aware system design", Online via Nokia (http://www.nokia.com/nokia/0,,53712,00.html).

Choi, I., Kim, H.S., Shin, H. and Chang, N. "LPBP: Low-power basis profile of the Java 2 micro edition" In Proceedings of the 2003 International Symposium on Low Power Electronics and Design (Seoul, Korea, Aug. 2003) ISLPED '03, ACM Press, New York, NY, p. 36-39.

U.S. Appl. No. 11/154,052—Non-final Office Action dated Nov. 10, 2009.

U.S. Appl. No. 11/154,054—Final Office Action dated Jun. 24, 2009.

U.S. Appl. No. 11/154,053—Non-final Office Action dated Jul. 23, 2009.

U.S. Appl. No. 11/202,903—Non-final Office Action dated Aug. 7, 2009.

U.S. Appl. No. 11/202,903—Final Office Action dated Dec. 28, 2009.

U.S. Appl. No. 11/224,792—Non-final Office Action dated Nov. 18, 2009.

U.S. Appl. No. 11/371,466—Non-final Office Action dated Dec. 14, 2009.

U.S. Appl. No. 11/154,054—Non-final Office Action dated Jan. 7, 2009.

U.S. Appl. No. 11/293,562—Non-final Office Action dated Jan. 7, 2009.

* cited by examiner

METHODS AND SYSTEMS FOR IMAGE TONESCALE ADJUSTMENT TO COMPENSATE FOR A REDUCED SOURCE LIGHT POWER LEVEL

RELATED REFERENCES

This application is a continuation-in-part of U.S. patent application Ser. No. 11/154,053, entitled "Methods and Systems for Enhancing Display Characteristics with High Frequency Contrast Enhancement," filed on Jun. 15, 2005; this application is also a continuation-in-part of U.S. patent application Ser. No. 11/154,054, entitled "Methods and Systems for Enhancing Display Characteristics with Frequency-Specific Gain," filed on Jun. 15, 2005; this application is also a continuation-in-part of U.S. patent application Ser. No. 11/154,052, entitled "Methods and Systems for Enhancing Display Characteristics," filed on Jun. 15, 2005; which claims the benefit of U.S. Provisional Patent Application No. 60/670,749, entitled "Brightness Preservation with Contrast Enhancement," filed on Apr. 11, 2005; and which claims the benefit of U.S. Provisional Patent Application No. 60/660,049, entitled "Contrast Preservation and Brightness Preservation in Low Power Mode of a Backlit Display," filed on Mar. 9, 2005; and which claims the benefit of U.S. Provisional Patent Application No. 60/632,776, entitled "Luminance Matching for Power Saving Mode in Backlit Displays," filed on Dec. 2, 2004; and which claims the benefit of U.S. Provisional Patent Application No. 60/632,779, entitled "Brightness Preservation for Power Saving Modes in Backlit Displays," filed on Dec. 2, 2004.

FIELD OF THE INVENTION

Embodiments of the present invention comprise methods and systems for enhancing the brightness, contrast and other qualities of a display to compensate for a reduced display source light power level.

BACKGROUND

A typical display device displays an image using a fixed range of luminance levels. For many displays, the luminance range has 256 levels that are uniformly spaced from 0 to 255. Image code values are generally assigned to match these levels directly.

In many electronic devices with large displays, the displays are the primary power consumers. For example, in a laptop computer, the display is likely to consume more power than any of the other components in the system. Many displays with limited power availability, such as those found in battery-powered devices, may use several illumination or brightness levels to help manage power consumption. A system may use a full-power mode when it is plugged into a power source, such as A/C power, and may use a power-save mode when operating on battery power.

In some devices, a display may automatically enter a power-save mode, in which the display illumination is reduced to conserve power. These devices may have multiple power-save modes in which illumination is reduced in a step-wise fashion. Generally, when the display illumination is reduced, image quality drops as well. When the maximum luminance level is reduced, the dynamic range of the display is reduced and image contrast suffers. Therefore, the contrast and other image qualities are reduced during typical power-save mode operation.

Many display devices, such as liquid crystal displays (LCDs) or digital micro-mirror devices (DMDs), use light valves which are backlit, side-lit or front-lit in one way or another. In a backlit light valve display, such as an LCD, a backlight is positioned behind a liquid crystal panel. The backlight radiates light through the LC panel, which modulates the light to register an image. Both luminance and color can be modulated in color displays. The individual LC pixels modulate the amount of light that is transmitted from the backlight and through the LC panel to the user's eyes or some other destination. In some cases, the destination may be a light sensor, such as a coupled-charge device (CCD).

Some displays may also use light emitters to register an image. These displays, such as light emitting diode (LED) displays and plasma displays use picture elements that emit light rather than reflect light from another source.

SUMMARY

Some embodiments of the present invention comprise systems and methods for varying a light-valve-modulated pixel's luminance modulation level to compensate for a reduced light source illumination intensity or to improve the image quality at a fixed light source illumination level.

Some embodiments of the present invention may also be used with displays that use light emitters to render an image. These displays, such as light emitting diode (LED) displays and plasma displays use picture elements that emit light rather than reflect light from another source. Embodiments of the present invention may be used to enhance the image produced by these devices. In these embodiments, the brightness of pixels may be adjusted to enhance the dynamic range of specific image frequency bands, luminance ranges and other image subdivisions.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
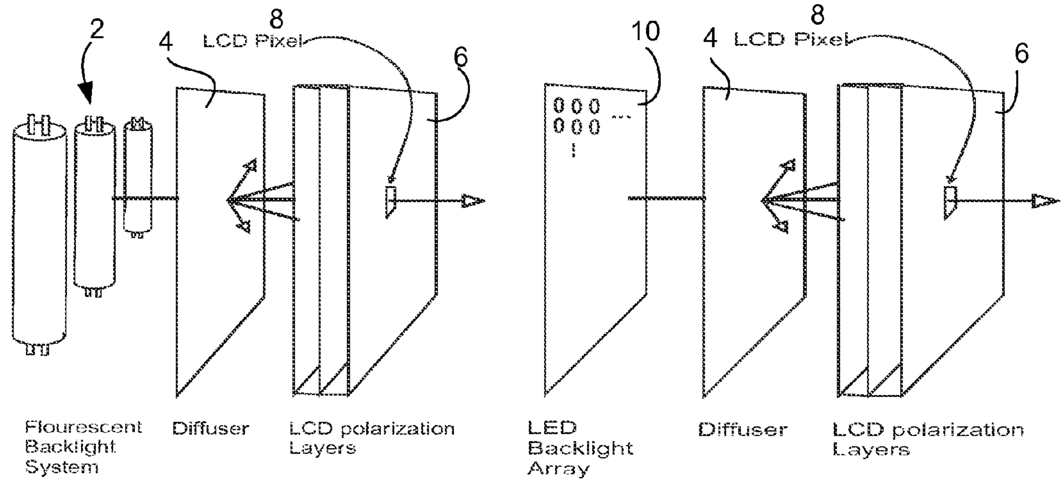
FIG. 1 is a diagram showing prior art backlit LCD systems.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Display devices using light valve modulators, such as LC modulators and other modulators may be reflective, wherein light is radiated onto the front surface (facing a viewer) and reflected back toward the viewer after passing through the modulation panel layer. Display devices may also be transmissive, wherein light is radiated onto the back of the modulation panel layer and allowed to pass through the modulation layer toward the viewer. Some display devices may also be transflexive, a combination of reflective and transmissive, wherein light may pass through the modulation layer from back to front while light from another source is reflected after entering from the front of the modulation layer. In any of these cases, the elements in the modulation layer, such as the individual LC elements, may control the perceived brightness of a pixel.

In backlit, front-lit and side-lit displays, the light source may be a series of fluorescent tubes, an LED array or some other source. Once the display is larger than a typical size of about 18", the majority of the power consumption for the device is due to the light source. For certain applications, and in certain markets, a reduction in power consumption is important. However, a reduction in power means a reduction in the light flux of the light source, and thus a reduction in the maximum brightness of the display.

A basic equation relating the current gamma-corrected light valve modulator's gray-level code values, CV, light source level, $L_{source}$, and output light level, $L_{out}$, is:

$$L_{out}=L_{source}*g(CV+\text{dark})^{\gamma}+\text{ambient} \quad (1)$$

Where g is a calibration gain, dark is the light valve's dark level, and ambient is the light hitting the display from the room conditions. From this equation, it can be seen that reducing the backlight light source by x % also reduces the light output by x %.

The reduction in the light source level can be compensated by changing the light valve's modulation values; in particular, boosting them. In fact, any light level less than (1-x %) can be reproduced exactly while any light level above (1-x %) cannot be reproduced without an additional light source or an increase in source intensity.

Setting the light output from the original and reduced sources gives a basic code value correction that may be used to correct code values for an x % reduction (assuming dark and ambient are 0) is:

$$L_{out}=L_{source}*g(CV)^{\gamma}=L_{reduced}*g(CV_{boost})^{\gamma} \quad (2)$$

$$CV_{boost}=CV*(L_{source}/L_{reduced})^{1/\gamma}=CV*(1/x\%)^{1/\gamma} \quad (3)$$

Figure 2A:
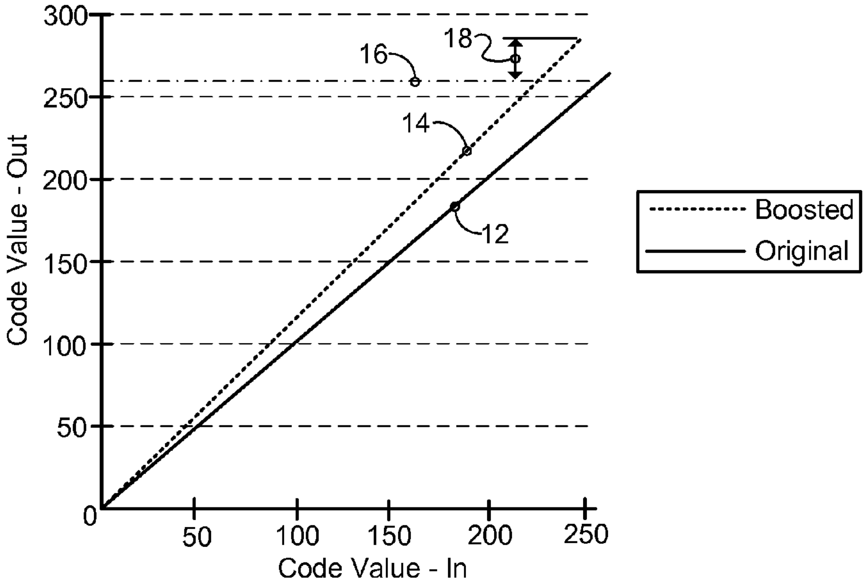
FIG. 2A is a chart showing the relationship between original image code values and boosted image code values.
Figure 2B:
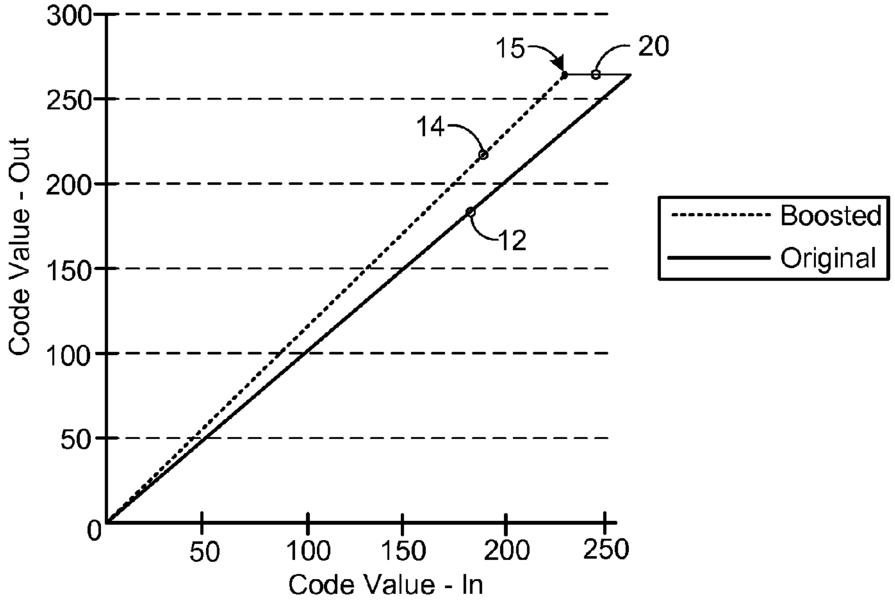
FIG. 2B is a chart showing the relationship between original image code values and boosted image code values with clipping.

FIG. 2A illustrates this adjustment. In FIGS. 2A and 2B, the original display values correspond to points along line 12. When the backlight or light source is placed in power-save mode and the light source illumination is reduced, the display code values need to be boosted to allow the light valves to counteract the reduction in light source illumination. These boosted values coincide with points along line 14. However, this adjustment results in code values 18 higher than the display is capable of producing (e.g., 255 for an 8 bit display). Consequently, these values end up being clipped 20 as illustrated in FIG. 2B. Images adjusted in this way may suffer from washed out highlights, an artificial look, and generally low quality.

Using this simple adjustment model, code values below the clipping point 15 (input code value 230 in this exemplary embodiment) will be displayed at a luminance level equal to the level produced with a full power light source while in a reduced source light illumination mode. The same luminance is produced with a lower power resulting in power savings. If the set of code values of an image are confined to the range below the clipping point 15 the power savings mode can be operated transparently to the user. Unfortunately, when values exceed the clipping point 15, luminance is reduced and detail is lost. Embodiments of the present invention provide an algorithm that can alter the LCD or light valve code values to provide increased brightness (or a lack of brightness reduction in power save mode) while reducing clipping artifacts that may occur at the high end of the luminance range.

Some embodiments of the present invention may eliminate the reduction in brightness associated with reducing display light source power by matching the image luminance displayed with low power to that displayed with full power for a significant range of values. In these embodiments, the reduction in source light or backlight power which divides the output luminance by a specific factor is compensated for by a boost in the image data by a reciprocal factor.

Ignoring dynamic range constraints, the images displayed under full power and reduced power may be identical because the division (for reduced light source illumination) and multiplication (for boosted code values) essentially cancel across a significant range. Dynamic range limits may cause clipping artifacts whenever the multiplication (for code value boost) of the image data exceeds the maximum of the display. Clipping artifacts caused by dynamic range constraints may be eliminated or reduced by rolling off the boost at the upper end of code values. This roll-off may start at a maximum fidelity point (MFP) above which the luminance is no longer matched to the original luminance.

In some embodiments of the present invention, the following steps may be executed to compensate for a light source illumination reduction or a virtual reduction for image enhancement:

1) A source light (backlight) reduction level is determined in terms of a percentage of luminance reduction;
2) A Maximum Fidelity Point (MFP) is determined at which a roll-off from matching reduced-power output to full-power output occurs;
3) Determine a compensating tone scale operator;
   a. Below the MFP, boost the tone scale to compensate for a reduction in display luminance;
   b. Above the MFP, roll off the tone scale gradually (in some embodiments, keeping continuous derivatives);
4) Apply tone scale mapping operator to image; and
5) Send to the display.

The primary advantage of these embodiments is that power savings can be achieved with only small changes to a narrow category of images. (Differences only occur above the MFP and consist of a reduction in peak brightness and some loss of bright detail). Image values below the MFP can be displayed in the power savings mode with the same luminance as the full power mode making these areas of an image indistinguishable from the full power mode.

Some embodiments of the present invention may use a tone scale map that is dependent upon the power reduction and display gamma and which is independent of image data. These embodiments may provide two advantages. Firstly, flicker artifacts which may arise due to processing frames differently do not arise, and, secondly, the algorithm has a very low implementation complexity. In some embodiments, an off-line tone scale design and on-line tone scale mapping may be used. Clipping in highlights may be controlled by the specification of the MFP.

Figure 3:
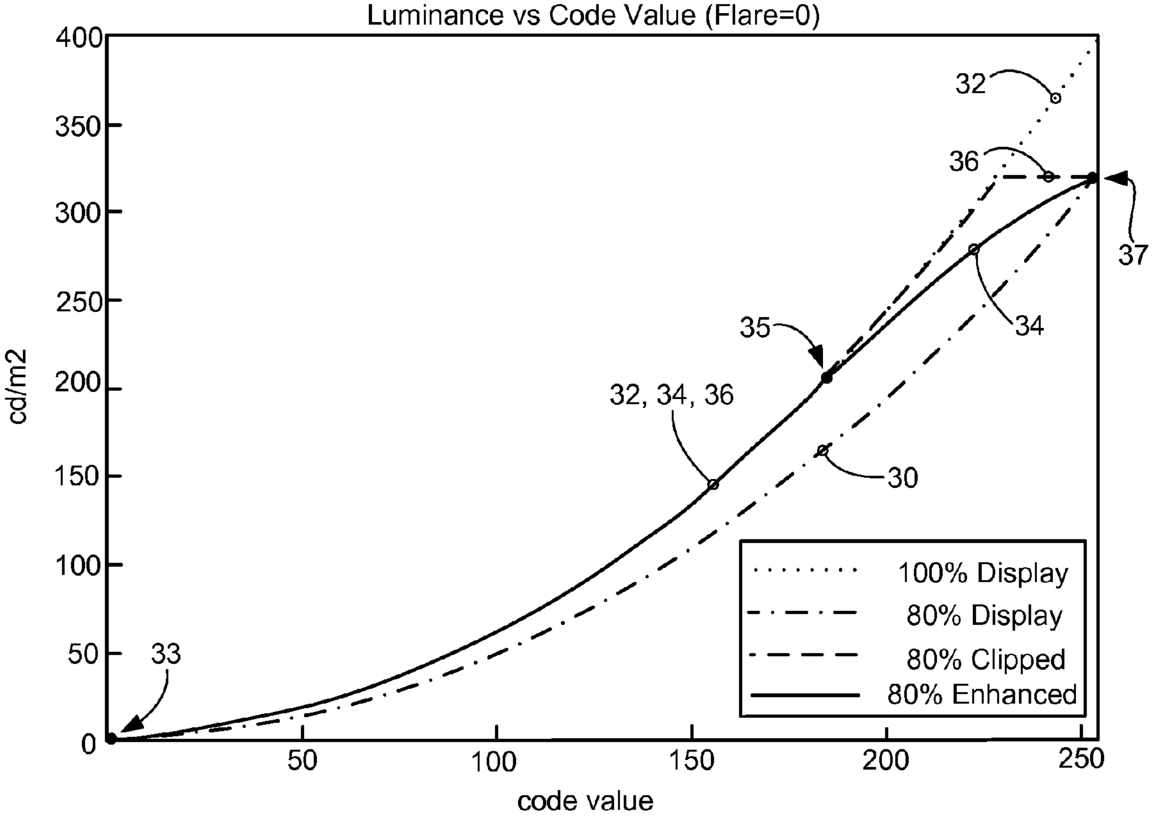
FIG. 3 is a chart showing the luminance level associated with code values for various code value modification schemes.

Some aspects of embodiments of the present invention may be described in relation to FIG. 3. FIG. 3 is a graph showing image code values plotted against luminance for several situations. A first curve 32, shown as dotted, represents the original code values for a light source operating at 100% power. A second curve 30, shown as a dash-dot curve, represents the luminance of the original code values when the light source operates at 80% of full power. A third curve 36, shown as a dashed curve, represents the luminance when code values are boosted to match the luminance provided at 100% light source illumination while the light source operates at 80% of full power. A fourth curve 34, shown as a solid line, represents the boosted data, but with a roll-off curve to reduce the effects of clipping at the high end of the data.

In this exemplary embodiment, shown in FIG. 3, an MFP 35 at code value 180 was used. Note that below code value 180, the boosted curve 34 matches the luminance output 32 by the original 100% power display. Above 180, the boosted curve smoothly transitions to the maximum output allowed on the 80% display. This smoothness reduces clipping and quantization artifacts. In some embodiments, the tone scale function may be defined piecewise to match smoothly at the transition point given by the MFP 35. Below the MFP 35, the boosted tone scale function may be used. Above the MFP 35, a curve is fit smoothly to the end point of boosted tone scale curve at the MFP and fit to the end point 37 at the maximum code value [255]. In some embodiments, the slope of the curve may be matched to the slope of the boosted tone scale curve/line at the MFP 35. This may be achieved by matching the slope of the line below the MFP to the slope of the curve above the MFP by equating the derivatives of the line and curve functions at the MFP and by matching the values of the line and curve functions at that point. Another constraint on the curve function may be that it be forced to pass through the maximum value point [255,255] 37. In some embodiments the slope of the curve may be set to 0 at the maximum value point 37. In some embodiments, an MFP value of 180 may correspond to a light source power reduction of 20%.

In some embodiments of the present invention, the tone scale curve may be defined by a linear relation with gain, g, below the Maximum Fidelity Point (MFP). The tone scale may be further defined above the MFP so that the curve and its first derivative are continuous at the MFP. This continuity implies the following form on the tone scale function:

$$y = \begin{cases} g \cdot x & x < MFP \\ C + B \cdot (x - MFP) + A \cdot (x - MFP)^2 & x \geq MFP \end{cases}$$

$$C = g \cdot MFP$$

$$B = g$$

$$A = \frac{\text{Max} - (C + B \cdot (\text{Max} - MFP)}{(\text{Max} - MFP)^2}$$

$$A = \frac{\text{Max} - g \cdot \text{Max}}{(\text{Max} - MFP)^2}$$

$$A = \frac{\text{Max} \cdot (1 - g)}{(\text{Max} - MFP)^2}$$

$$y = \begin{cases} g \cdot x & x < MFP \\ g \cdot x + \text{Max} \cdot (1 - g) \cdot \left(\frac{x - MFP}{\text{Max} - MFP}\right)^2 & x \geq MFP \end{cases}$$

The gain may be determined by display gamma and brightness reduction ratio as follows:

$$g = \left(\frac{FullPower}{ReducedPower}\right)^{\frac{1}{\gamma}}$$

In some embodiments, the MFP value may be tuned by hand balancing highlight detail preservation with absolute brightness preservation.

The MFP can be determined by imposing the constraint that the slope be zero at the maximum point. This implies:

$$\text{slope} = \begin{cases} g & x < MFP \\ g + 2 \cdot \text{Max} \cdot (1 - g) \cdot \frac{x - MFP}{(\text{Max} - MFP)^2} & x \geq MFP \end{cases}$$

$$\text{slope(Max)} = g + 2 \cdot \text{Max} \cdot (1 - g) \cdot \frac{\text{Max} - MFP}{(\text{Max} - MFP)^2}$$

$$\text{slope(Max)} = g + \frac{2 \cdot \text{Max} \cdot (1 - g)}{\text{Max} - MFP}$$

$$\text{slope(Max)} = \frac{g \cdot (\text{Max} - MFP) + 2 \cdot \text{Max} \cdot (1 - g)}{\text{Max} - MFP}$$

$$\text{slope(Max)} = \frac{2 \cdot \text{Max} - g \cdot (\text{Max} + MFP)}{\text{Max} - MFP}$$

In some exemplary embodiments, the following equations may be used to calculate the code values for simple boosted data, boosted data with clipping and corrected data, respectively, according to an exemplary embodiment.

$$ToneScale_{boost}(cv) = (1/x)^{1/\gamma} \cdot cv$$

$$ToneScale_{clipped}(cv) = \begin{cases} (1/x)^{1/\gamma} \cdot cv & cv \leq 255 \cdot (x)^{1/\gamma} \\ 255 & \text{otherwise} \end{cases}$$

$$ToneScale_{corrected}(cv) = \begin{cases} (1/x)^{1/\gamma} \cdot cv & cv \leq MFP \\ A \cdot cv^2 + B \cdot cv + C & \text{otherwise} \end{cases}$$

The constants A, B, and C may be chosen to give a smooth fit at the MFP and so that the curve passes through the point [255,255]. Plots of these functions are shown in FIG. 4.

Figure 4:
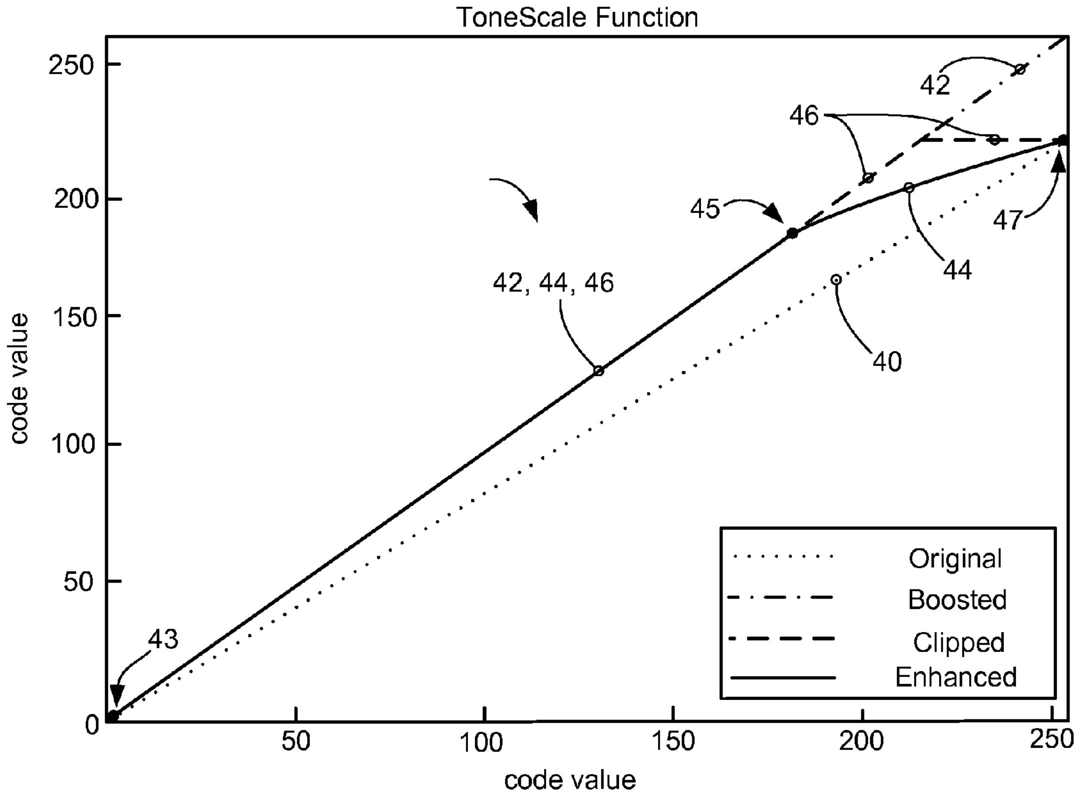
FIG. 4 is a chart showing the relationship between original image code values and modified image code values according to various modification schemes.

FIG. 4 is a plot of original code values vs. adjusted code values. Original code values are shown as points along original data line 40, which shows a 1:1 relationship between adjusted and original values as these values are original without adjustment. According to embodiments of the present invention, these values may be boosted or adjusted to represent higher luminance levels. A simple boost procedure according to the "tonescale boost" equation above, may result in values along boost line 42. Since display of these values will result in clipping, as shown graphically at line 46 and mathematically in the "tonescale clipped" equation above, the adjustment may taper off from a maximum fidelity point 45 along curve 44 to the maximum value point 47. In some embodiments, this relationship may be described mathematically in the "tonescale corrected" equation above.

Using these concepts, luminance values represented by the display with a light source operating at 100% power may be represented by the display with a light source operating at a lower power level. This is achieved through a boost of the tone scale, which essentially opens the light valves further to compensate for the loss of light source illumination. However, a simple application of this boosting across the entire code value range results in clipping artifacts at the high end of the range. To prevent or reduce these artifacts, the tone scale function may be rolled-off smoothly. This roll-off may be controlled by the MFP parameter. Large values of MFP give luminance matches over a wide interval but increase the visible quantization/clipping artifacts at the high end of code values.

Embodiments of the present invention may operate by adjusting code values. In a simple gamma display model, the scaling of code values gives a scaling of luminance values, with a different scale factor. To determine whether this relation holds under more realistic display models, we may consider the Gamma Offset Gain-Flair (GOG-F) model. Scaling the backlight power corresponds to linear reduced equations where a percentage, p, is applied to the output of the display, not the ambient. It has been observed that reducing the gain by a factor p is equivalent to leaving the gain unmodified and scaling the data, code values and offset, by a factor determined by the display gamma. Mathematically, the multiplicative factor can be pulled into the power function if suitably modified. This modified factor may scale both the code values and the offset.

$$L = G\cdot(CV+\text{dark})^{\gamma}+\text{ambient} \quad \text{Equation 1 GOG-F model}$$

$$^{L}\text{Linear reduced} = p\cdot G\cdot(CV+\text{dark})^{\gamma}+\text{ambient}$$

$$^{L}\text{Linear reduced} = G\cdot(p^{1/\gamma}\cdot(CV+\text{dark}))^{\gamma}+\text{ambient}$$

$$^{L}\text{Linear reduced} = G\cdot(p^{1/\gamma}\cdot CV + p^{1/\gamma}\cdot\text{dark})^{\gamma}+\text{ambient} \quad \text{Equation 2 Linear Luminance Reduction}$$

$$^{L}CV\text{ reduced} = G\cdot(p^{1/\gamma}\cdot CV + \text{dark})^{\gamma}+\text{ambient} \quad \text{Equation 3 Code Value Reduction}$$

Figure 5:
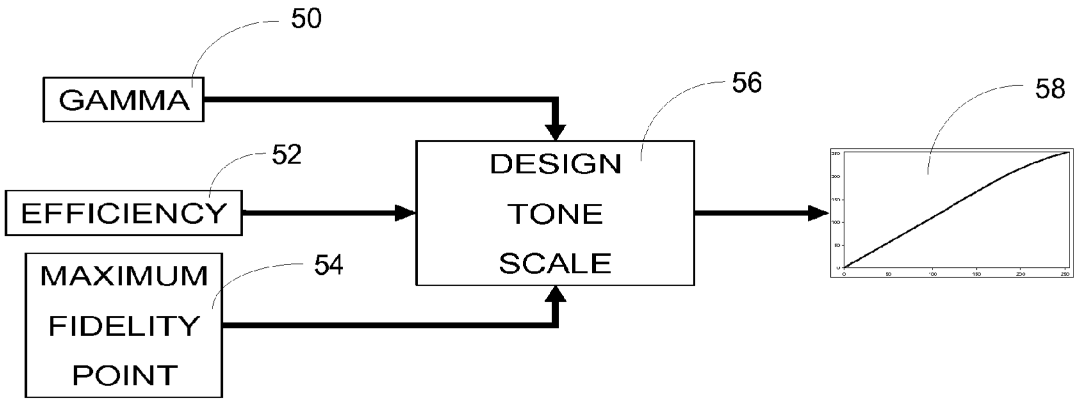
FIG. 5 is a diagram showing the generation of an exemplary tone scale adjustment model.

Some embodiments of the present invention may be described with reference to FIG. 5. In these embodiments, a tone scale adjustment may be designed or calculated off-line, prior to image processing, or the adjustment may be designed or calculated on-line as the image is being processed. Regardless of the timing of the operation, the tone scale adjustment 56 may be designed or calculated based on at least one of a display gamma 50, an efficiency factor 52 and a maximum fidelity point (MFP) 54. These factors may be processed in the tone scale design process 56 to produce a tone scale adjustment model 58. The tone scale adjustment model may take the form of an algorithm, a look-up table (LUT) or some other model that may be applied to image data.

Figure 6:
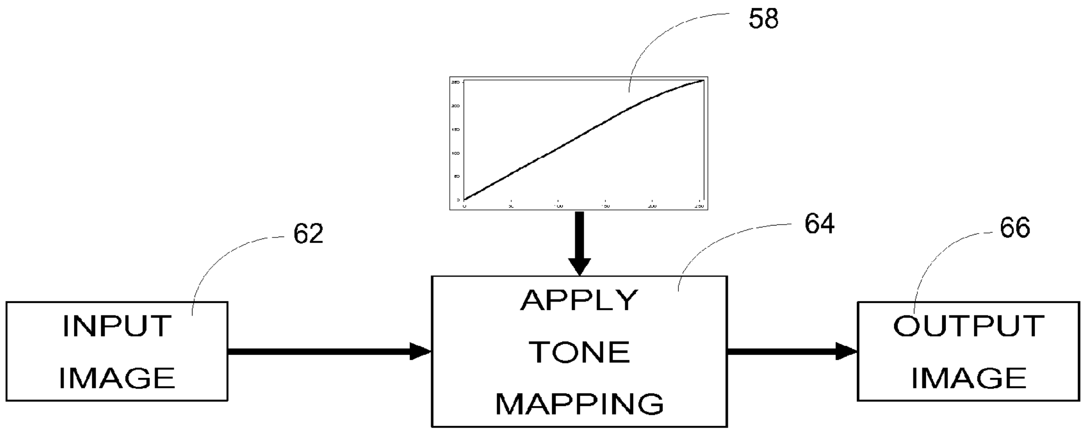
FIG. 6 is a diagram showing an exemplary application of a tone scale adjustment model.

Once the adjustment model 58 has been created, it may be applied to the image data. The application of the adjustment model may be described with reference to FIG. 6. In these embodiments, an image is input 62 and the tone scale adjustment model 58 is applied 64 to the image to adjust the image code values. This process results in an output image 66 that may be sent to a display. Application 64 of the tone scale adjustment is typically an on-line process, but may be performed in advance of image display when conditions allow.

Some embodiments of the present invention comprise systems and methods for enhancing images displayed on displays using light-emitting pixel modulators, such as LED displays, plasma displays and other types of displays. These same systems and methods may be used to enhance images displayed on displays using light-valve pixel modulators with light sources operating in full power mode or otherwise.

These embodiments work similarly to the previously-described embodiments, however, rather than compensating for a reduced light source illumination, these embodiments simply increase the luminance of a range of pixels as if the light source had been reduced. In this manner, the overall brightness of the image is improved.

In these embodiments, the original code values are boosted across a significant range of values. This code value adjustment may be carried out as explained above for other embodiments, except that no actual light source illumination reduction occurs. Therefore, the image brightness is increased significantly over a wide range of code values.

Some of these embodiments may be explained with reference to FIG. 3 as well. In these embodiments, code values for an original image are shown as points along curve 30. These values may be boosted or adjusted to values with a higher luminance level. These boosted values may be represented as points along curve 34, which extends from the zero point 33 to the maximum fidelity point 35 and then tapers off to the maximum value point 37.

Some embodiments of the present invention comprise an unsharp masking process. In some of these embodiments the unsharp masking may use a spatially varying gain. This gain may be determined by the image value and the slope of the modified tone scale curve. In some embodiments, the use of a gain array enables matching the image contrast even when the image brightness cannot be duplicated due to limitations on the display power.

Some embodiments of the present invention may take the following process steps:

1. Compute a tone scale adjustment model;
2. Compute a High Pass image;
3. Compute a Gain array;
4. Weight High Pass Image by Gain;
5. Sum Low Pass Image and Weighted High Pass Image; and
6. Send to the display Other embodiments of the present invention may take the following process steps:

1. Compute a tone scale adjustment model;
2. Compute Low Pass image;
3. Compute High Pass image as difference between Image and Low Pass image;
4. Compute Gain array using image value and slope of modified Tone Scale Curve;
5. Weight High Pass Image by Gain;
6. Sum Low Pass Image and Weighted High Pass Image; and
7. Send to the reduced power display.

Using some embodiments of the present invention, power savings can be achieved with only small changes on a narrow category of images. (Differences only occur above the MFP and consist of a reduction in peak brightness and some loss of bright detail). Image values below the MFP can be displayed in the power savings mode with the same luminance as the full power mode making these areas of an image indistinguishable from the full power mode. Other embodiments of the present invention improve this performance by reducing the loss of bright detail.

These embodiments may comprise spatially varying unsharp masking to preserve bright detail. As with other embodiments, both an on-line and an off-line component may be used. In some embodiments, an off-line component may be extended by computing a gain map in addition to the Tone Scale function. The gain map may specify an unsharp filter gain to apply based on an image value. A gain map value may be determined using the slope of the Tone Scale function. In some embodiments, the gain map value at a particular point "P" may be calculated as the ratio of the slope of the Tone Scale function below the MFP to the slope of the Tone Scale function at point "P." In some embodiments, the Tone Scale function is linear below the MFP, therefore, the gain is unity below the MFP.

Figure 7:
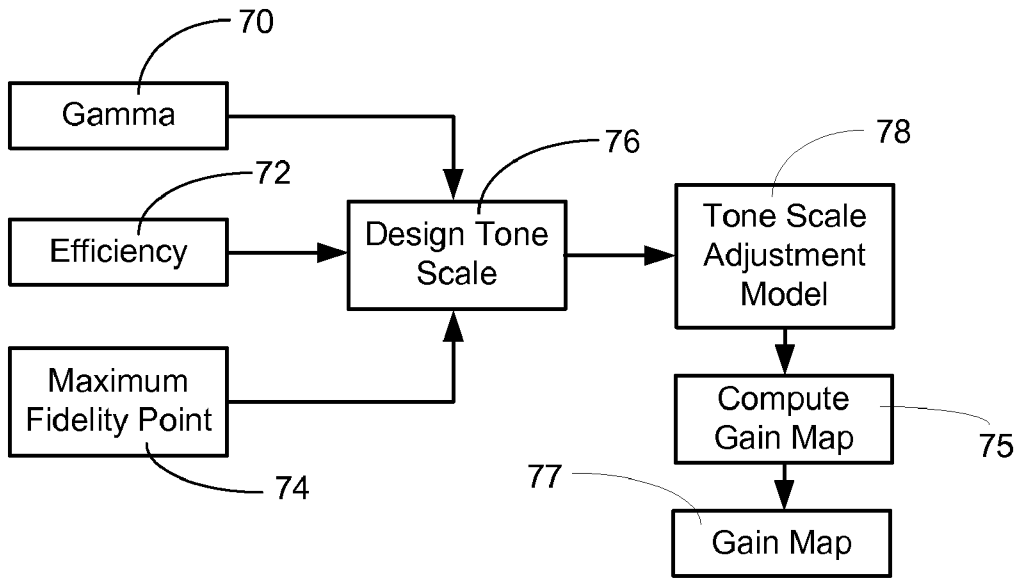
FIG. 7 is a diagram showing the generation of an exemplary tone scale adjustment model and gain map.

Some embodiments of the present invention may be described with reference to FIG. 7. In these embodiments, a tone scale adjustment may be designed or calculated off-line, prior to image processing, or the adjustment may be designed or calculated on-line as the image is being processed. Regardless of the timing of the operation, the tone scale adjustment 76 may be designed or calculated based on at least one of a display gamma 70, an efficiency factor 72 and a maximum fidelity point (MFP) 74. These factors may be processed in the tone scale design process 76 to produce a tone scale adjustment model 78. The tone scale adjustment model may take the form of an algorithm, a look-up table (LUT) or some other model that may be applied to image data as described in relation to other embodiments above. In these embodiments, a separate gain map 77 is also computed 75. This gain map 77 may be applied to specific image subdivisions, such as frequency ranges. In some embodiments, the gain map may be applied to frequency-divided portions of an image. In some embodiments, the gain map may be applied to a high-pass image subdivision. It may also be applied to specific image frequency ranges or other image subdivisions.

Figure 8:
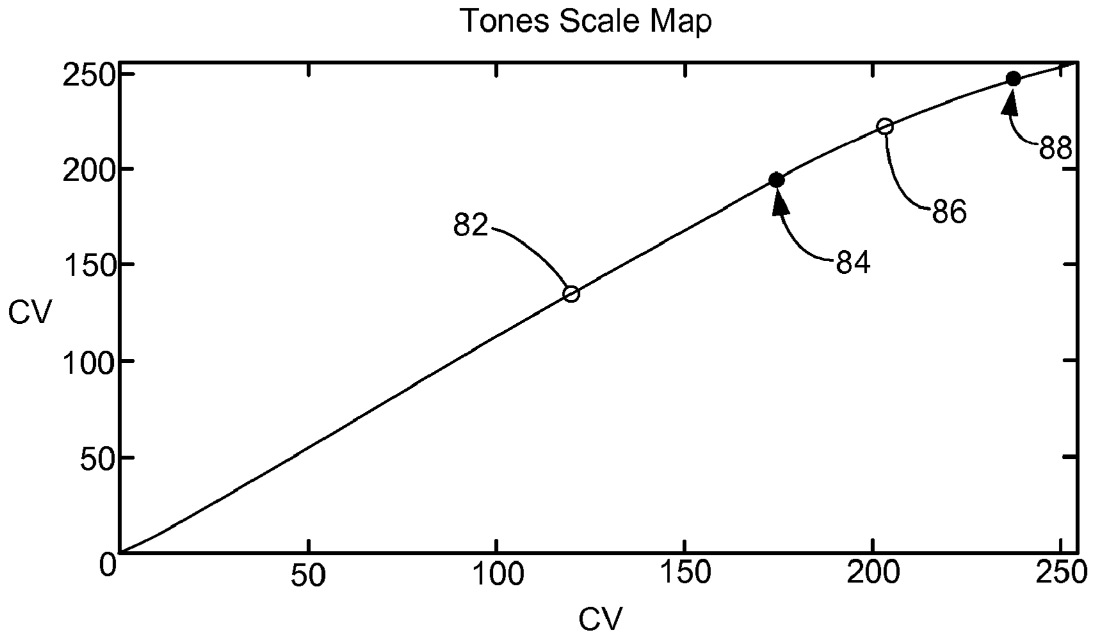
FIG. 8 is a chart showing an exemplary tone scale adjustment model.

An exemplary tone scale adjustment model may be described in relation to FIG. 8. In these exemplary embodiments, a Function Transition Point (FTP) 84 (similar to the MFP used in light source reduction compensation embodiments) is selected and a gain function is selected to provide a first gain relationship 82 for values below the FTP 84. In some embodiments, the first gain relationship may be a linear relationship, but other relationships and functions may be used to convert code values to enhanced code values. Above the FTP 84, a second gain relationship 86 may be used. This second gain relationship 86 may be a function that joins the FTP 84 with a maximum value point 88. In some embodiments, the second gain relationship 86 may match the value and slope of the first gain relationship 82 at the FTP 84 and pass through the maximum value point 88. Other relationships, as described above in relation to other embodiments, and still other relationships may also serve as a second gain relationship 86.

In some embodiments, a gain map 77 may be calculated in relation to the tone scale adjustment model, as shown in FIG. 8. An exemplary gain map 77, may be described in relation to FIG. 9. In these embodiments, a gain map function relates to the tone scale adjustment model 78 as a function of the slope of the tone scale adjustment model. In some embodiments, the value of the gain map function at a specific code value is determined by the ratio of the slope of the tone scale adjustment model at any code value below the FTP to the slope of the tone scale adjustment model at that specific code value. In some embodiments, this relationship may be expressed mathematically in the following equation:

$$\text{Gain}(cv) = \frac{ToneScaleSlope(1)}{ToneScaleSlope(cv)}$$

In these embodiments, the gain map function is equal to one below the FTP where the tone scale adjustment model results in a linear boost. For code values above the FTP, the gain map function increases quickly as the slope of the tone scale adjustment model tapers off. This sharp increase in the gain map function enhances the contrast of the image portions to which it is applied.

Figure 9:
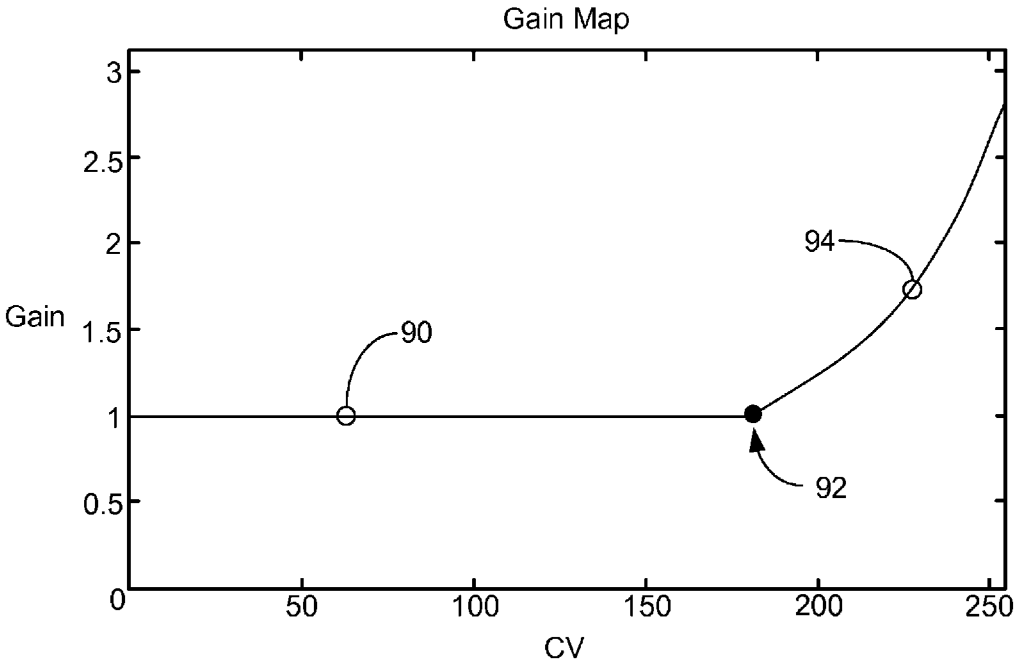
FIG. 9 is a chart showing an exemplary gain map.

The exemplary tone scale adjustment factor illustrated in FIG. 8 and the exemplary gain map function illustrated in FIG. 9 were calculated using a display percentage (source light reduction) of 80%, a display gamma of 2.2 and a Maximum Fidelity Point of 180.

In some embodiments of the present invention, an unsharp masking operation may be applied following the application of the tone scale adjustment model. In these embodiments, artifacts are reduced with the unsharp masking technique.

Figure 10:
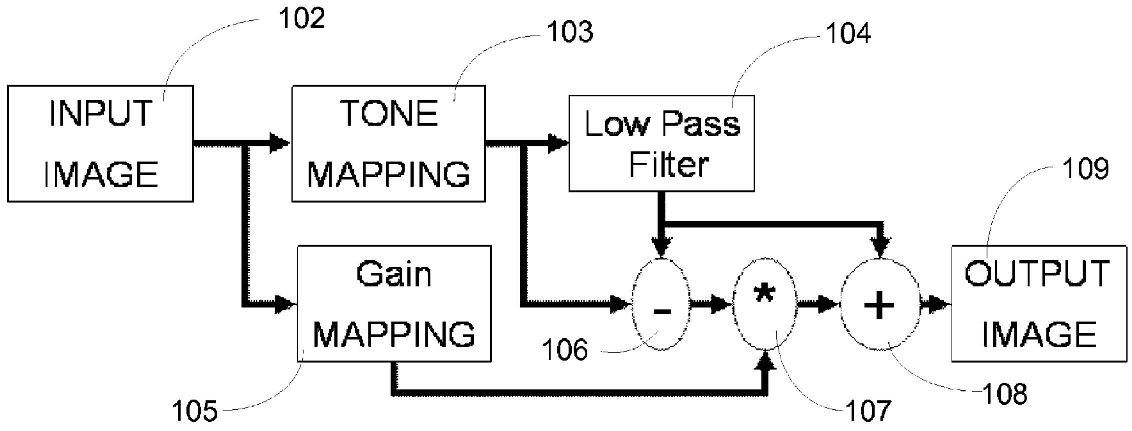
FIG. 10 is a flow chart showing an exemplary process wherein a tone scale adjustment model and gain map are applied to an image.

Some embodiments of the present invention may be described in relation to FIG. 10. In these embodiments, an original image 102 is input and a tone scale adjustment model 103 is applied to the image. The original image 102 is also used as input to a gain mapping process 105 which results in a gain map. The tone scale adjusted image is then processed through a low pass filter 104 resulting in a low-pass adjusted image. The low pass adjusted image is then subtracted 106 from the tone scale adjusted image to yield a high-pass adjusted image. This high-pass adjusted image is then multiplied 107 by the appropriate value in the gain map to provide a gain-adjusted high-pass image which is then added 108 to the low-pass adjusted image, which has already been adjusted with the tone scale adjustment model. This addition results in an output image 109 with increased brightness and improved high-frequency contrast.

In some of these embodiments, for each component of each pixel of the image, a gain value is determined from the Gain map and the image value at that pixel. The original image 102, prior to application of the tone scale adjustment model, may be used to determine the Gain. Each component of each pixel of the high-pass image may also be scaled by the corresponding gain value before being added back to the low pass image. At points where the gain map function is one, the unsharp masking operation does not modify the image values. At points where the gain map function exceeds one, the contrast is increased.

Some embodiments of the present invention address the loss of contrast in high-end code values, when increasing code value brightness, by decomposing an image into multiple frequency bands. In some embodiments, a Tone Scale Function may be applied to a low-pass band increasing the brightness of the image data to compensate for source-light luminance reduction on a low power setting or simply to increase the brightness of a displayed image. In parallel, a constant gain may be applied to a high-pass band preserving the image contrast even in areas where the mean absolute brightness is reduced due to the lower display power. The operation of an exemplary algorithm is given by:

1. Perform frequency decomposition of original image
2. Apply brightness preservation, Tone Scale Map, to a Low Pass Image
3. Apply constant multiplier to High Pass Image
4. Sum Low Pass and High Pass Images
5. Send result to the display The Tone Scale Function and the constant gain may be determined off-line by creating a photometric match between the full power display of the original image and the low power display of the process image for source-light illumination reduction applications. The Tone Scale Function may also be determined off-line for brightness enhancement applications.

For modest MFP values, these constant-high-pass gain embodiments and the unsharp masking embodiments are nearly indistinguishable in their performance. These constant-high-pass gain embodiments have three main advantages compared to the unsharp masking embodiments: reduced noise sensitivity, ability to use larger MFP/FTP and use of processing steps currently in the display system. The unsharp masking embodiments use a gain which is the inverse of the slope of the Tone Scale Curve. When the slope of this curve is small, this gain incurs a large amplifying noise. This noise amplification may also place a practical limit on the size of the MFP/FTP. The second advantage is the ability to extend to arbitrary MFP/FTP values. The third advantage comes from examining the placement of the algorithm within a system. Both the constant-high-pass gain embodiments and the unsharp masking embodiments use frequency decomposition. The constant-high-pass gain embodiments perform this operation first while some unsharp masking embodiments first apply a Tone Scale Function before the frequency decomposition. Some system processing such as de-contouring will perform frequency decomposition prior to the brightness preservation algorithm. In these cases, that frequency decomposition can be used by some constant-high-pass embodiments thereby eliminating a conversion step while some unsharp masking embodiments must invert the frequency decomposition, apply the Tone Scale Function and perform additional frequency decomposition.

Some embodiments of the present invention prevent the loss of contrast in high-end code values by splitting the image based on spatial frequency prior to application of the tone scale function. In these embodiments, the tone scale function with roll-off may be applied to the low pass (LP) component of the image. In light-source illumination reduction compensation applications, this will provide an overall luminance match of the low pass image components. In these embodiments, the high pass (HP) component is uniformly boosted (constant gain). The frequency-decomposed signals may be recombined and clipped as needed. Detail is preserved since the high pass component is not passed through the roll-off of the tone scale function. The smooth roll-off of the low pass tone scale function preserves head room for adding the boosted high pass contrast. Clipping that may occur in this final combination has not been found to reduce detail significantly.

Figure 11:
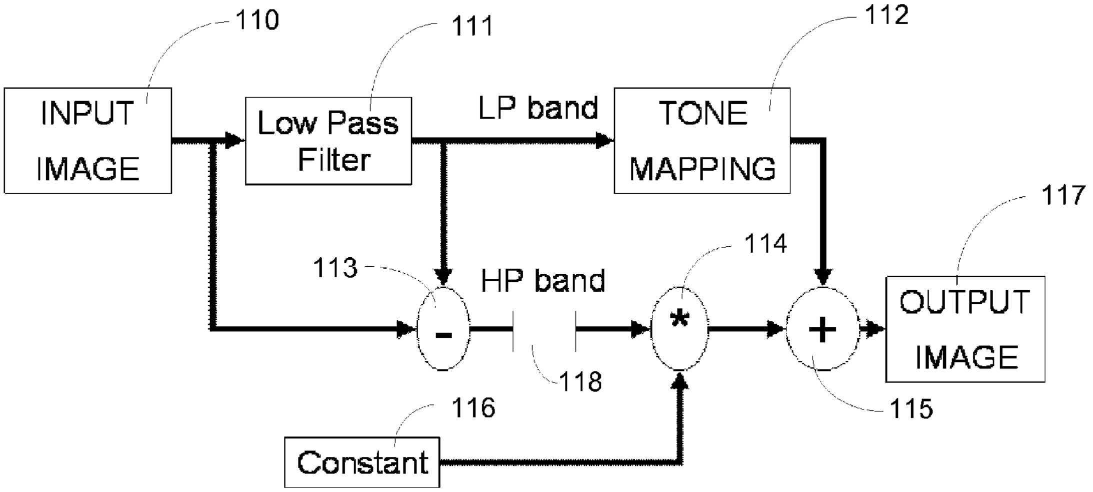
FIG. 11 is a flow chart showing an exemplary process wherein a tone scale adjustment model is applied to one frequency band of an image and a gain map is applied to another frequency band of the image.

Some embodiments of the present invention may be described with reference to FIG. 11. These embodiments comprise frequency splitting or decomposition 111, low-pass tone scale mapping 112, constant high-pass gain or boost 116 and summation or re-combination 115 of the enhanced image components.

In these embodiments, an input image 110 is decomposed into spatial frequency bands 111. In an exemplary embodiment, in which two bands are used, this may be performed using a low-pass (LP) filter 111. The frequency division is performed by computing the LP signal via a filter 111 and subtracting 113 the LP signal from the original to form a high-pass (HP) signal 118. In an exemplary embodiment, spatial 5×5 rect filter may be used for this decomposition though another filter may be used.

The LP signal may then be processed by application of tone scale mapping as discussed for previously described embodiments. In an exemplary embodiment, this may be achieved with a Photometric matching LUT. In these embodiments, a higher value of MFP/FTP can be used compared to some previously described unsharp masking embodiment since most detail has already been extracted in filtering 111. Clipping should not generally be used since some head room should typically be preserved in which to add contrast.

Figure 12:
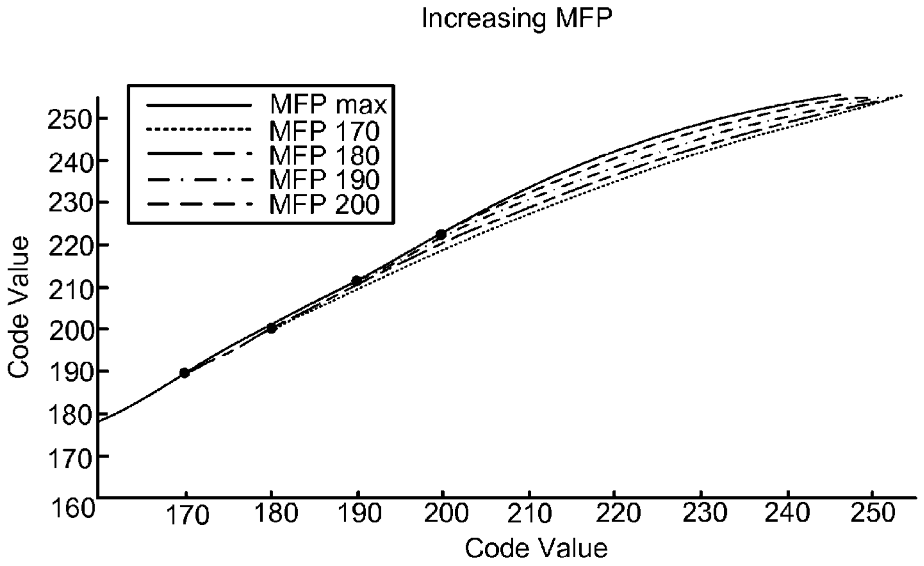
FIG. 12 is a chart showing tone scale adjustment model variations as the MFP changes.

In some embodiments, the MFP/FTP may be determined automatically and may be set so that the slope of the Tone Scale Curve is zero at the upper limit. A series of tone scale functions determined in this manner are illustrated in FIG. 12. In these embodiments, the maximum value of MFP/FTP may be determined such that the tone scale function has slope zero at 255. This is the largest MFP/FTP value that does not cause clipping.

In some embodiments of the present invention, described with reference to FIG. 11, processing the HP signal 118 is independent of the choice of MFP/FTP used in processing the low pass signal. The HP signal 118 is processed with a constant gain 116 which will preserve the contrast when the power/light-source illumination is reduced or when the image code values are otherwise boosted to improve brightness. The formula for the HP signal gain 116 in terms of the full and reduced backlight powers (BL) and display gamma is given immediately below as a high pass gain equation. The HP contrast boost is robust against noise since the gain is typically small (e.g. gain is 1.1 for 80% power reduction and gamma 2.2).

$$HighPassGain = \left(\frac{BL_{Full}}{BL_{Reduced}}\right)^{1/\gamma}$$

In some embodiments, once the tone scale mapping 112 has been applied to the LP signal, through LUT processing or otherwise, and the constant gain 116 has been applied to the HP signal, these frequency components may be summed 115 and, in some cases, clipped. Clipping may be necessary when the boosted HP value added to the LP value exceeds 255. This will typically only be relevant for bright signals with high contrast. In some embodiments, the LP signal is guaranteed not to exceed the upper limit by the tone scale LUT construction. The HP signal may cause clipping in the sum, but the negative values of the HP signal will never clip maintaining some contrast even when clipping does occur.

Histogram-Related Embodiments

Figure 13:
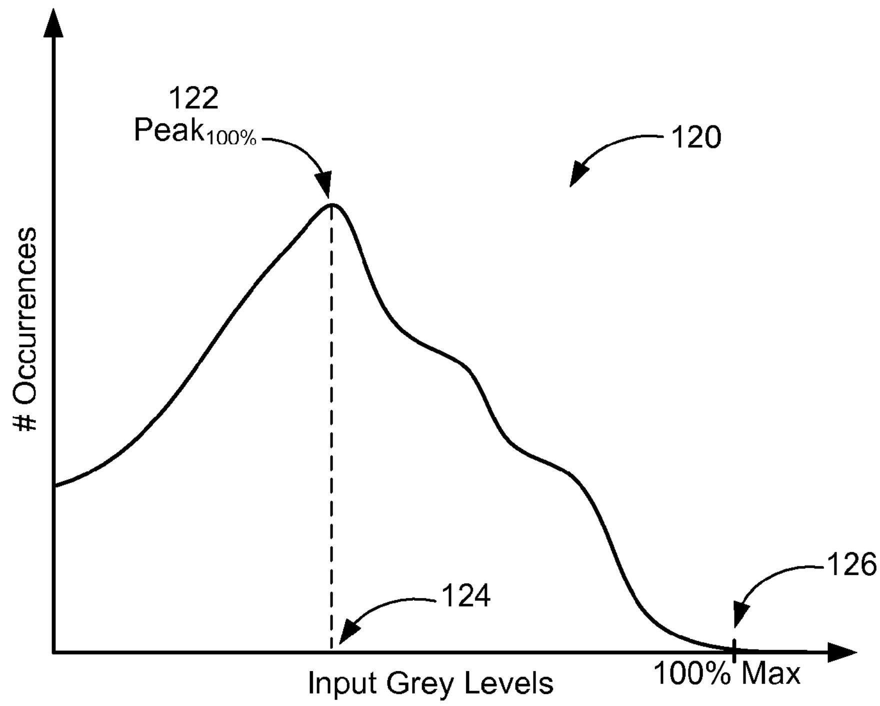
FIG. 13 is a diagram of an exemplary image histogram.

Some embodiments of the present invention may use an adaptive tone mapping algorithm based on input image data, such as an image histogram. An exemplary image histogram 120 is shown in FIG. 13. In some embodiments, histogram features may be used as input to a tone mapping algorithm. In some of these embodiments, the input luminance or gray level 124 corresponding to a peak occurrence 122 may influence the tone mapping algorithm. Other histogram features, such as but not limited to a minimum input gray level and a maximum input gray level may also be used as tone mapping algorithm input.

Once a histogram 120 is established, a source light power reduction level may be simulated by reducing image code values to a level that emits substantially the same illumination at 100% power as the display would emit for the original image at a reduced source light power level. Display characteristics may effect this simulation in some embodiments. This simulation may result in a simulated, power-reduced histogram 130, shown in FIG. 14, that is shifted from the original histogram 120 when displayed at 100% power. The simulated, power-reduced histogram 130 will have features, such as a peak 132 and corresponding input gray level 128, that correspond to features in the original histogram 120.

In some embodiments, the difference, in input gray level, 134 between a feature in the original histogram 120 and the corresponding feature in the simulated, power-reduced histogram 130 may be a factor in a tone mapping calculation. In some embodiments, the feature corresponding to this difference 134 may be a histogram peak. When the feature is a histogram peak value, typically the largest region of the image will be most influential in the tone mapping calculation. In some embodiments, the peak region of the histogram may be associated with a spatially-dispersed region, but will, generally, still represent the most visually significant gray levels. Typically, when histogram peaks 122, 132 are an influential feature in tone mapping and the difference 134 between the peaks is a significant factor in tone mapping magnitude, the most visually significant part of the image will have substantially the same perceived brightness when compensated, e.g., displayed at a reduced power level (with adjusted code values) as the original image when displayed at full power.

In some embodiments, the minimum input gray level and the maximum input gray level may also be used in tone mapping algorithms. In some embodiments, the maximum display code value and the minimum display code value may also be used for tone mapping algorithm input.

While tone mapping may be accomplished by adding an offset, this may unnecessarily raise black levels and cause details in brighter regions to go over the display maximum code value. Values over the display maximum will be clipped resulting in a loss of contrast at the upper end of the code value range.

In some embodiments of the present invention, a line, curve or piecewise aggregation of lines or curves may be fitted to key points on a tone map or tone-scale map. In some embodiments, a curve may be fitted such that the zero code level of the input image maps to a zero output code level; such that the maximum input code level maps to a maximum output code level and such that the code level corresponding to a histogram feature is increased by an amount proportional to the difference between a code level corresponding to that feature in an original image histogram and the code level corresponding to a corresponding feature in a simulated, power-reduced histogram.

In some embodiments of the present invention, a tone mapping curve may be used that maps the input gray level of an original image histogram peak to the output gray level that is greater than the input gray level by an amount proportional to the difference between a code level corresponding to that peak in an original image histogram and the code level corresponding to a corresponding peak in a simulated, power-reduced histogram.

In some embodiments of the present invention, a power function may be normalized at the display code value maximum. In these embodiments, the minimum value at zero and the maximum value at 255 will be mapped to the same output points, respectively. Additionally, the power function is selected to make the input code value corresponding to an original image histogram peak increase by an amount that will make the display illumination of the original image substantially equal to the display illumination of the tone mapped code value at a reduced source light power level. In some embodiments, the pixels corresponding to the input code value of the histogram peak will have the same display luminance, when displayed at full power, as the corresponding tone mapped pixels when displayed at a reduced power level.

Some embodiments of the present invention may comprise a display luminance model that correlates an input gray level or code value and a selected source light power level to an enhanced gray level or code value that will display at substantially the same luminance with the selected source light power level as the input gray level would display at full power. In these embodiments, the simulated, reduced-power histogram may not be necessary as the input image histogram peak gray level may be mapped directly to an enhanced gray level that may be used as a data point in calculating a tonescale correction curve.

Figure 14:
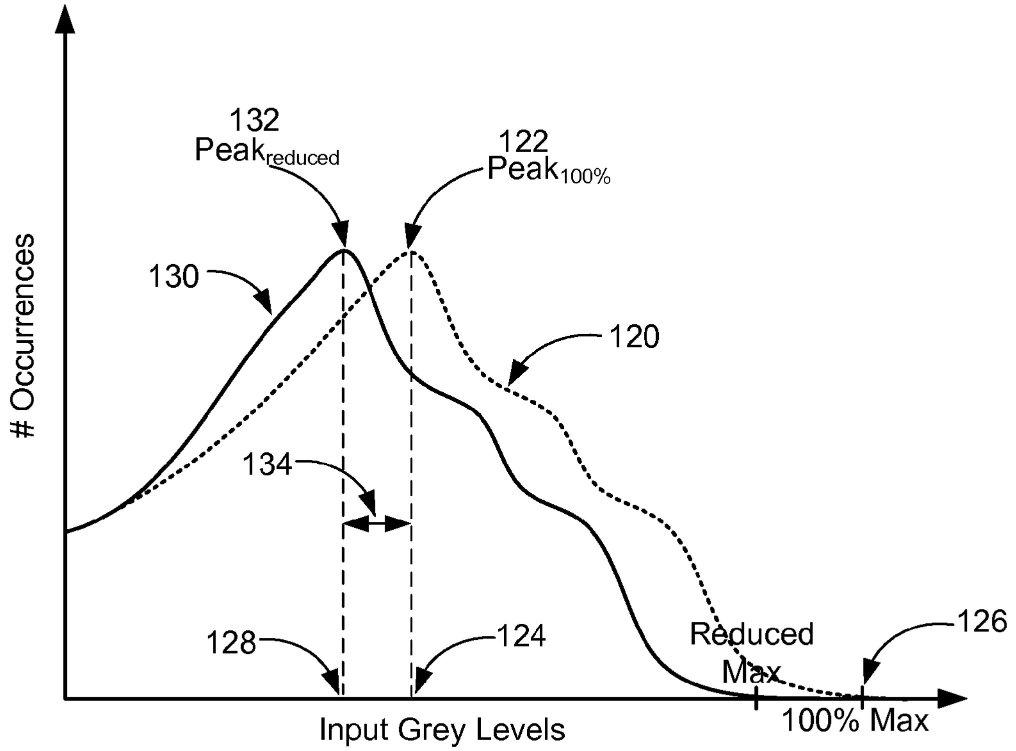
FIG. 14 is a diagram showing the exemplary image histogram of FIG. 13 and a simulated, reduced-power histogram.
Figure 15:
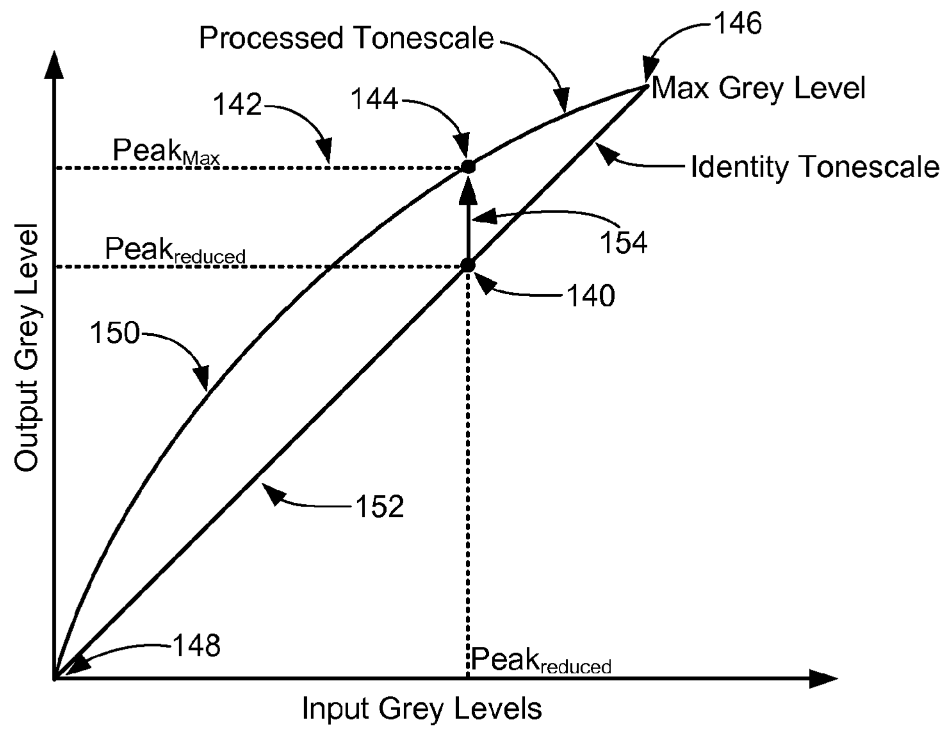
FIG. 15 is a diagram showing an exemplary tonescale adjustment curve.

Some embodiments of the present invention may be described with reference to FIG. 15. FIG. 15 shows an exemplary tone mapping curve wherein input gray level values are mapped to output gray level values. In these embodiments, a tonescale curve 150 is generated that matches the identity tonescale curve 152 at the zero point 148 and the maximum gray level point 146. At the peak histogram gray level value 142, the new tonescale curve 150 intersects a point above the identity tonescale curve by a distance 154 substantially equal to the difference 134 between the original image histogram peak value 122 and the simulated, reduced-power histogram peak value 132 as shown in FIG. 14.

Figure 16:
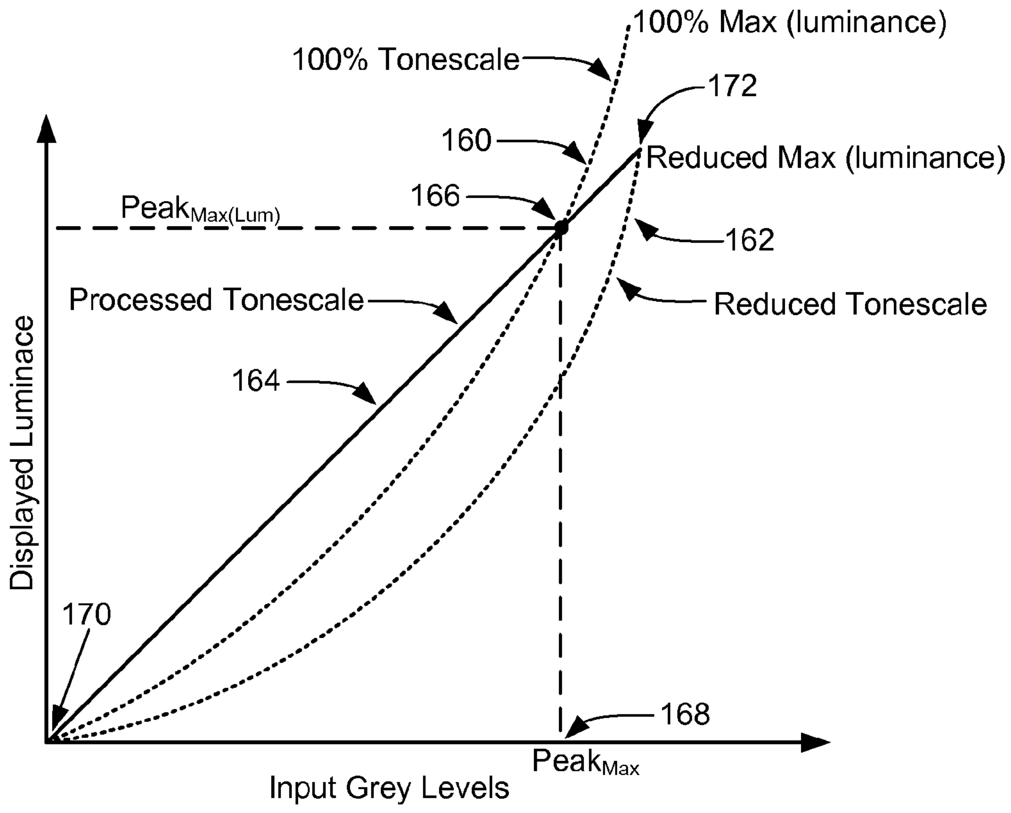
FIG. 16 is a diagram showing actual luminances that result from the tonescale adjustment curve of FIG. 15.

The concept of these embodiments may also be illustrated with reference to FIG. 16, which is a graph that maps input gray levels to display luminance levels (as opposed to output gray levels, as shown in FIG. 15). FIG. 16 shows an original image tonescale 160 as displayed at full display source light power and a reduced power image tonescale 162, which is the original image as displayed at a reduced display light source power level. From the graph, it is evident that the reduced power image will have a displayed luminance well below that of the image displayed at full power. To counteract this loss of displayed luminance, a processed tonescale algorithm illustrated with a processed tonescale curve 164 may be used to improve displayed luminance while avoiding any clipping or an amount of clipping as well as avoiding an elevation of the black level. This processed tonescale algorithm may be described by a tonescale curve 164 that intersects a zero point 170, a maximum value point 172 and an elevated peak histogram value point 166. In some embodiments, the elevated peak histogram value point 166 will correspond to the gray level that gives the peak histogram gray level at reduced power substantially the same luminance as the peak histogram gray level value when displayed at full power.

In some embodiments, the processed tonescale curve 150, 164 may be a power function, $\acute{\alpha}$, represented by the equation, $$\acute{\alpha}=\ln((1/\text{reduction\_ratio})^{1/\gamma}\times cv'_{peak})/\ln(cv'_{peak})$$

where cv' is the peak histogram value in normalized code values.

FIG. 16 also shows the typical gamma characteristic of a display.

In these embodiments, the luminance values of the histogram peak gray level of the displayed full power image and that of the processed, reduced-power image are substantially equal. In some embodiments, a smaller correction may be implemented, such as a percentage of the distance 134, 154 between histogram peaks.

Because many observers perceive image brightness based on the largest image region, an image displayed at a reduced power level, but processed to match the peak histogram luminance of the full power image, will be perceived as having the same brightness as the full power image.

When a histogram peak occurs at a low gray level, some embodiments may not perform well. This may occur when an image has a bright, detailed, but smaller region and a larger dark region with little detail, such as may occur in a photograph taken through the window of a dark room or from a cave opening. Accordingly, some embodiments of the present invention may comprise a minimum histogram peak level. In these embodiments, histogram peaks below a threshold level may not be considered. In some exemplary embodiments related to 8-bit color channels or grayscale levels (total range of 256), histogram peaks below 64 may be ignored and the highest peak above 64 may be used for matching as described above. In some embodiments, bright regions may be excluded from histogram peak selection. In some exemplary embodiments related to 8-bit color channels or grayscale levels (total range of 256), histogram peaks above 224 may be ignored and the highest peak below 224 may be used for matching as described above.

Figure 17:
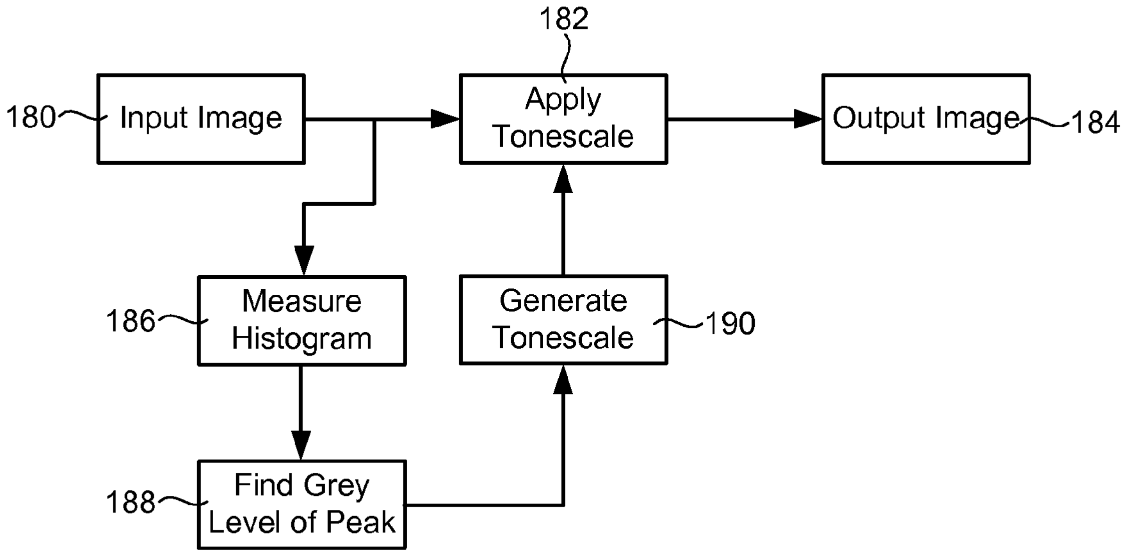
FIG. 17 is a chart showing an exemplary system of the present invention.

Some embodiments of the present invention may be described with reference to FIG. 17, which is system block diagram. In these embodiments, and input image 180 is received and an input image histogram is generated 186. The histogram peak is then determined and the corresponding gray level of the peak is found 188. In some embodiments, the gray level of a simulated, reduced-power histogram peak may also measured and the difference between the peak gray levels of the input image histogram and the simulated, reduced-power histogram may be determined.

In other embodiments, the simulated, reduced-power histogram may not need to be calculated and the input image histogram peak gray level may be mapped directly to a new value based on source light power level and display characteristics.

Once the peak gray level has been mapped to a new value, that value may be used as input to a tonescale correction curve or tone map generator 190, which may generate an image tone map related to the new peak value. This tone map may then be applied 182 to the input image to improve brightness at reduced power. Application of the tone map to the input image results in an output image 184 that is suitable for display with a reduced source light power level.

In some embodiments of the present invention, a power function may be fitted to tonescale data points to identify a tonescale correction curve or tone map. In other embodiments, another non-linear curve may be fitted to the data points.

In some embodiments of the present invention, the tonescale correction or tone map may be applied to only a portion of the image or one or more specific regions in an image.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method for adjusting an image for display with a reduced source light power level, said method comprising:

a) creating an input image histogram for an input image;

b) locating a histogram feature on said input image histogram;

c) finding an input image histogram feature code value corresponding to said histogram feature;

d) determining an enhanced feature code value based on said input image histogram feature code value and a reduced source light power level;

e) establishing a tonescale correction curve fitted to said enhanced feature code value; and f) processing at least a portion of said input image with said tonescale correction curve.

2. A method as described in claim 1 wherein said histogram feature is a histogram peak.

3. A method as described in claim 1 wherein said determining comprises calculating a simulated, reduced-power histogram, finding the difference between the code value of the input image histogram feature and the simulated, reduced-power histogram feature and adding said difference to the input image histogram feature code value.

4. A method as described in claim 1 wherein said determining comprises mapping said input image histogram feature code value to an enhanced code value with a display luminance model.

5. A method as described in claim 1 wherein said determining comprises finding a code value for a reduced source light power level wherein a display emits substantially the same luminance using a said code value and said reduced source light power level as said as said display emits using said image histogram feature code value and a full power source light.

6. A method as described in claim 1 wherein said processing at least a portion of said image comprises applying said tonescale correction curve to specific frequency range of said image.

7. A method as described in claim 1 wherein said establishing a tonescale correction curve comprises fitting a power curve to said enhanced feature code value and a point that maps a zero input code value to zero output code value.

8. A method as described in claim 1 wherein said establishing a tonescale correction curve comprises fitting a power curve to said enhanced feature code value, a point that maps a zero input code value to zero output code value and a point that maps a maximum input code value to a maximum output code value.

9. A method for adjusting an image for display with a reduced source light power level, said method comprising:

a) creating an input image histogram for an input image;

b) locating an input image histogram peak on said input image histogram;

c) finding an input image histogram peak code value corresponding to said histogram peak;

d) determining an enhanced peak code value for a reduced source light power level wherein a display emits a substantially similar amount of light at said reduced source light power level using said enhanced peak code value as said display emits using said input image histogram peak code value with a full power source light; and e) calculating a tonescale correction curve that intersects said enhanced peak code value.

10. A method as described in claim 9 wherein said determining an enhanced peak code value comprises calculating a simulated, reduced-power histogram, finding the difference between the code value of the input image histogram peak and the simulated, reduced-power histogram peak and adding said difference to the input image histogram peak code value.

11. A method as described in claim 9 wherein said determining an enhanced peak code value comprises mapping said input image histogram peak code value to an enhanced peak code value with a display luminance model.

12. A method as described in claim 9 further comprising applying said tonescale correction curve to a specific frequency range of said image.

13. A method as described in claim 9 wherein said calculating a tonescale correction curve comprises fitting a power curve to said enhanced peak code value and a point that maps a zero input code value to a zero output code value.

14. A method as described in claim 9 wherein said calculating a tonescale correction curve comprises fitting a power curve to said enhanced peak code value, a point that maps a zero input code value to a zero output code value and a point that maps a maximum input code value to a maximum output code value.

15. A system for adjusting an image for display with a reduced source light power level, said system comprising:

a) a histogram generator for creating an input image histogram for an input image;

b) a peak detector for locating an input image histogram peak on said input image histogram and a code value corresponding to said histogram peak;

c) a processor for determining an enhanced peak code value for a reduced source light power level wherein a display emits a substantially similar amount of light at said reduced source light power level using said enhanced peak code value as said display emits using said input image histogram peak code value with a full power source light; and d) a tonescale correction calculator for calculating a tonescale correction curve that intersects said enhanced peak code value.

16. A system as described in claim 15 wherein said processor for determining an enhanced peak code value calculates a simulated, reduced-power histogram, finds the difference between the code value of the input image histogram peak and the simulated, reduced-power histogram peak and adds said difference to the input image histogram peak code value.

17. A system as described in claim 15 wherein said processor for determining an enhanced peak code value maps said input image histogram peak code value to an enhanced peak code value with a display luminance model.

18. A system as described in claim 15 wherein said calculator for calculating a tonescale correction curve fits a power curve to said enhanced peak code value.

19. A system as described in claim 15 wherein said calculator for calculating a tonescale correction curve fits a power curve to said enhanced peak code value and a point that maps a zero input code value to a zero output code value.

20. A system as described in claim 15 wherein said calculator for calculating a tonescale correction curve fits a power curve to said enhanced peak code value, a point that maps a zero input code value to a zero output code value and a point that maps a maximum input code value to a maximum output code value.

* * * * *